(12) United States Patent
Jahren et al.

(10) Patent No.: US 11,249,908 B1
(45) Date of Patent: Feb. 15, 2022

(54) TECHNIQUE FOR MANAGING COHERENCY WHEN AN AGENT IS TO ENTER A STATE IN WHICH ITS CACHE STORAGE IS UNUSED

(71) Applicant: Arm Limited, Cambridge (GB)

(72) Inventors: Ole Henrik Jahren, Trondheim (NO);
Ian Rudolf Bratt, Portola Valley, CA (US); Sigurd Røed Scheistrøen, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/023,771

(22) Filed: Sep. 17, 2020

(51) Int. Cl.
| G06F 12/00 | (2006.01) |
| G06F 12/0831 | (2016.01) |
| G06F 12/0891 | (2016.01) |
| G06F 9/30 | (2018.01) |
| G06F 9/54 | (2006.01) |
| G06F 12/02 | (2006.01) |

(52) U.S. Cl.
CPC ...... *G06F 12/0833* (2013.01); *G06F 9/30047* (2013.01); *G06F 9/546* (2013.01); *G06F 12/0246* (2013.01); *G06F 12/0891* (2013.01)

(58) Field of Classification Search
CPC ............. G06F 12/0833; G06F 12/0246; G06F 12/0891; G06F 9/30047; G06F 9/546
See application file for complete search history.

(56) References Cited

U.S. PATENT DOCUMENTS

| 8,856,448 B2* | 10/2014 | Morrow | G06F 12/0808 711/128 |
| 2003/0097530 A1* | 5/2003 | Arimilli | G06F 12/0831 711/146 |
| 2003/0097531 A1* | 5/2003 | Arimilli | G06F 12/0831 711/146 |

(Continued)

*Primary Examiner* — Prasith Thammavong
(74) *Attorney, Agent, or Firm* — Nixon & Vanderhye P.C.

(57) ABSTRACT

An apparatus and method are disclosed for managing cache coherency. The apparatus has a plurality of agents with cache storage for caching data, and coherency control circuitry for acting as a point of coherency for the data by implementing a cache coherency protocol. In accordance with the cache coherency protocol the coherency control circuitry responds to certain coherency events by issuing coherency messages to one or more of the agents. A given agent is arranged, prior to entering a given state in which its cache storage is unused, to perform a flush operation in respect of its cache storage that may cause one or more evict messages to be issued to the coherency control circuitry. Further, once all evict messages resulting from performance of the flush operation has been issued, the given agent issues an evict barrier message to the coherency control circuitry. The apparatus ensures that the evict barrier message is only processed by the coherency control circuitry once all evict messages resulting from performance of the flush operation have been processed by the coherency control circuitry. When processing the evict barrier message, the coherency control circuitry issues a barrier response message to the given agent once it is determined that there are no outstanding coherency messages, and the given agent defers entering (Continued)

the given state until at least the barrier response message is received.

17 Claims, 7 Drawing Sheets

(56) References Cited

U.S. PATENT DOCUMENTS

| | | | | |
|---|---|---|---|---|
| 2014/0025891 | A1* | 1/2014 | McCormack | G06F 12/0837 |
| | | | | 711/119 |
| 2014/0379993 | A1* | 12/2014 | Gupta | G06F 12/0808 |
| | | | | 711/135 |
| 2015/0032969 | A1 | 1/2015 | Bratt et al. | |
| 2016/0314091 | A1* | 10/2016 | Dutt | G06F 15/7825 |
| 2018/0217933 | A1* | 8/2018 | Sherlock | G06F 12/0862 |
| 2018/0307601 | A1* | 10/2018 | Sherlock | G06F 12/0804 |

* cited by examiner

TECHNIQUE FOR MANAGING COHERENCY WHEN AN AGENT IS TO ENTER A STATE IN WHICH ITS CACHE STORAGE IS UNUSED

BACKGROUND

The present technique relates to the management of coherency when an agent within a system is to enter a state in which its cache storage is unused.

A data processing system may comprise multiple agents that each have associated cache storage in which they can cache data, in order to enable more rapid access to that data than would be the case if instead the data needed to be accessed in memory. However, since this enables individual agents to store a local copy of one or more blocks of data, this can give rise to an issue of coherency, and in particular it is important to ensure that each agent is able to access the most up to date version of any particular block of data.

In order to handle such coherency issues, it is known to provide coherency control circuitry within the system that can act as a point of coherency for cacheable data by implementing a cache coherency protocol to ensure that each agent, when accessing an item of data, accesses the most up to date version of that item of data. In order to implement the cache coherency protocol, the coherency control circuitry may monitor accesses being made by the various agents, and may need to issue coherency messages to one or more of those agents, for example to cause local cached copies of certain data to be invalidated, and/or to retrieve from one local cache the most up to date version of a particular item of data, so that that up to date version can be provided in response to an access request issued by a different agent.

In some instances, it may be desirable for an agent to enter a state in which its local cache storage is unused. For example, the agent may wish to enter a low power state in order to reduce the overall power consumption within the system, for instance in situations where that agent is idle. However, it is important to ensure that the agent only transitions into such a state at a point in time where it can be ensured that the application of the cache coherency protocol is not compromised, since in such a situation certain messages issued in order to implement the cache coherency protocol may not be actioned, which can result in potential loss of data, and/or deadlocks arising. This issue is complicated by the fact that, in some systems, an agent may be arranged, when evicting data from its cache, to issue evict messages that do not need to be acknowledged by the coherency control circuitry, and hence the agent does not know when such evict messages have been received and handled by the coherency control circuitry.

It would be desirable to provide an improved mechanism for managing coherency within a system in situations where an agent is to enter a state in which its cache storage is unused.

SUMMARY

In one example arrangement, there is provided an apparatus comprising: a plurality of agents having cache storage to cache data; coherency control circuitry to act as a point of coherency for the data by implementing a cache coherency protocol to ensure that each agent, when accessing an item of data, accesses a most up to date version of that item of data, wherein in accordance with the cache coherency protocol the coherency control circuitry is responsive to a coherency event to issue coherency messages to one or more of the agents; and interconnect circuitry to provide communication between the plurality of agents and the coherency control circuitry; wherein: a given agent amongst the plurality of agents is arranged, prior to entering a given state in which its cache storage is unused, to perform a flush operation in respect of its cache storage that causes one or more evict messages to be issued to the coherency control circuitry, and the given agent is further arranged, once all evict messages resulting from performance of the flush operation have been issued, to issue an evict barrier message to the coherency control circuitry; the apparatus is arranged to ensure that the evict barrier message is only processed by the coherency control circuitry once all evict messages resulting from performance of the flush operation have been processed by the coherency control circuitry; the coherency control circuitry is arranged, when processing the evict barrier message, to issue a barrier response message to the given agent once the coherency control circuitry determines that no there are no outstanding coherency messages issued by the coherency control circuitry to the given agent; and the given agent is arranged to defer entering the given state until at least the barrier response message has been received.

In another example arrangement there is provided a method of managing coherency in an apparatus with a plurality of agents having cache storage to cache data, comprising: employing coherency control circuitry to act as a point of coherency for the data by implementing a cache coherency protocol to ensure that each agent, when accessing an item of data, accesses a most up to date version of that item of data; arranging the coherency control circuitry, in accordance with the cache coherency protocol, to be responsive to a coherency event to issue coherency messages to one or more of the agents; employing interconnect circuitry to provide communication between the plurality of agents and the coherency control circuitry; causing a given agent amongst the plurality of agents, prior to entering a given state in which its cache storage is unused, to perform a flush operation in respect of its cache storage that causes one or more evict messages to be issued to the coherency control circuitry; issuing from the given agent, once all evict messages resulting from performance of the flush operation have been issued, an evict barrier message to the coherency control circuitry; applying an ordering technique to ensure that the evict barrier message is only processed by the coherency control circuitry once all evict messages resulting from performance of the flush operation have been processed by the coherency control circuitry; arranging the coherency control circuitry, when processing the evict barrier message, to issue a barrier response message to the given agent once the coherency control circuitry determines that no there are no outstanding coherency messages issued by the coherency control circuitry to the given agent; and constraining the given agent to defer entering the given state until at least the barrier response message has been received.

In a still further example arrangement, there is provided an apparatus comprising: a plurality of agent means having cache storage for caching data; coherency control means for acting as a point of coherency for the data by implementing a cache coherency protocol to ensure that each agent means, when accessing an item of data, accesses a most up to date version of that item of data, wherein in accordance with the cache coherency protocol the coherency control means is responsive to a coherency event to issue coherency messages to one or more of the agent means; and interconnect means for providing communication between the plurality of agent means and the coherency control means; wherein: a given agent means amongst the plurality of agent means is arranged, prior to entering a given state in which its cache storage is unused, for performing a flush operation in respect of its cache storage that causes one or more evict messages to be issued to the coherency control means, and the given agent means is further arranged, once all evict messages resulting from performance of the flush operation have been issued, for issuing an evict barrier message to the coherency control means; the apparatus is arranged to ensure that the evict barrier message is only processed by the coherency control means once all evict messages resulting from performance of the flush operation have been processed by the coherency control means; the coherency control means, when processing the evict barrier message, for issuing a barrier response message to the given agent means once the coherency control means determines that no there are no outstanding coherency messages issued by the coherency control means to the given agent means; and the given agent means for deferring entering the given state until at least the barrier response message has been received.

BRIEF DESCRIPTION OF THE DRAWINGS

The present technique will be described further, by way of illustration only, with reference to examples thereof as illustrated in the accompanying drawings, in which.

DESCRIPTION OF EXAMPLES

In accordance with one example implementation, an apparatus is provided that comprises a plurality of agents having cache storage to cache data. In some implementations, there may be some further agents that do not have cache storage. To deal with cache coherency issues resulting from multiple agents being able to locally cache data, the apparatus also provides coherency control circuitry that acts as a point of coherency within the system for the data, by implementing a cache coherency protocol. By implementing the cache coherency protocol, this ensures that each agent, when accessing an item of data, accesses the most up to date version of that item of data. In addition to acting as a point of coherency, the coherency control circuitry will often also act as a point of serialisation to order the access requests issued by the various agents.

In accordance with the cache coherency protocol, the coherency control circuitry is arranged, responsive to certain coherency events, to issue coherency messages to one or more of the agents. For example, the coherency control circuitry will typically include snoop buffers/directories which maintain information identifying which items of data are cached by which caches, and hence when a request is received identifying the address of a particular item of data, the coherency control circuitry can make reference to such snoop buffers/directories in order to identify whether the data being requested is cached by one or more of the local cache storages, and in that instance can issue coherency messages to one or more of the agents. The form of those coherency messages will depend upon the cache coherency protocol being implemented, but may for example cause one or more of the local caches to return to the coherency control circuitry the data they have stored therein and/or for one or more of those cache storages to invalidate their local copy of the data.

The apparatus is provided with interconnect circuitry to provide communication between the plurality of agents and the coherency control circuitry. In some implementations, the interconnect circuitry can be extended to also allow communication with other entities within the system, for instance a variety of functional blocks, which may for example include one or more slave elements that can be targeted by access requests.

In accordance with the techniques described herein, one or more of the agents may be able to enter a given state in which its local cache storage is unused. Such an agent (also referred to herein as the given agent) is arranged to perform a flush operation in respect of its cache storage prior to entering such a state. Performance of the flush operation may cause one or more evict messages to be issued to the coherency control circuitry. In some instances no evict messages may be issued in response to the flush operation, for example because all of the cache lines are dirty or no valid cache lines are present in the cache, but the present technique is used in situations where one or more evict messages are issued.

Whilst for certain types of messages associated with coherency management, acknowledgements may be issued for those messages, for some messages the system may be arranged so that no acknowledgement is issued. This can for example be the case for the above mentioned evict messages, and one such system is described for example in commonly owned patent publication US2015/0032969A1, the entire contents of which are hereby incorporated by reference.

As described therein, by removing acknowledgement messages in association with such evict messages, this avoids the need for an agent to keep track of pending evict messages that are sent to the coherency control circuitry, and avoids that agent needing to defer acting upon subsequent requests relating to the same cache line of data until such a confirmation of receipt has been received. In particular, by removing the need for acknowledgement signals to be sent for such evict messages, if an agent issues an evict message for a line of data and then wishes shortly thereafter to issue a read message relating to that line of data, then instead of having to stall that read message pending receipt of an acknowledgement of the evict message, the techniques described in the above-mentioned patent publication permit the read message to be issued without waiting for the acknowledgement message for the preceding evict message.

Such an approach can thereby increase performance and reduce the overhead and complexity associated with the agent.

However, in the context of the earlier-mentioned situation where the agent wishes to enter a state in which its cache storage is no longer used, this causes a problem in determining a safe point in time for the agent to enter that state. In particular, this lack of response for evict messages can mean that the placing of a coherent agent into such a state of operation can be expensive, since it may require the coherency control circuitry to analyse all entries of its snoop filter/directory structures in order to ensure that none are in a state that could lead to the requirement to subsequently send coherency messages to the agent that is seeking to enter the above-mentioned state. Alternatively, some form of explicit connect and disconnect mechanism may need to be provided to support connection and disconnection of agents from the coherency functionality, which increases cost and complexity.

However in accordance with the techniques described herein, an improved mechanism is provided that ensures that by the time the agent has entered the state in which its cache storage is not utilised, it has been ensured that no coherency messages will in due course be required to that agent, by virtue of the way in which the cache coherency protocol is implemented, i.e. this desired condition occurs naturally due to the protocol used.

In particular, in accordance with the techniques described herein, the given agent is further arranged, once all evict messages resulting from performance of the flush operation have been issued, to issue an evict barrier message to the coherency control circuitry. Further, the apparatus is arranged to ensure that the evict barrier message is only processed by the coherency control circuitry once all evict messages resulting from performance of the flush operation have been processed by the coherency control circuitry. In one example implementation, the evict barrier message will only be processed once all preceding evict messages from the same agent (whether due to the flush or otherwise) have been handled by the coherency control circuitry.

As a result, this means that by the time the evict barrier message is processed by the coherency control circuitry, all preceding evict messages from that agent have been observed at the point of coherency. This ensures that no new coherency messages will be generated for that agent in respect of the evicted data.

However, there could be some pending coherency messages for the agent to which a response is yet awaited. In order to address this point, the coherency control circuitry is arranged, when processing the evict barrier message, to only issue a barrier response message to the given agent once the coherency control circuitry determines that there are no outstanding coherency messages issued by the coherency control circuitry to the given agent. Once no outstanding coherency messages remain, it is then known that it is safe for the agent to enter the state in which its cache storage is no longer used, without any risk of compromising the correct operation of the cache coherency protocol. Accordingly, at that point the barrier response message can be issued, and the given agent is arranged to defer entering the given state until at least the barrier response message has been received.

Through the use of the evict barrier message mechanism described above, this provides an efficient mechanism for ensuring that by the time a given agent enters a state in which its cache storage is unused, no coherency messages to that agent are possible naturally in accordance with the protocol adopted, even though the given agent does not receive responses for the individual evict messages that it issues.

Hence, through use of the technique described above, this means that cache coherency can be handled correctly in the presence of an agent entering a state in which its cache storage is unused, whilst still allowing that agent during normal operation to issue evict messages that will not be acknowledged by the coherency control circuitry. Hence, the given agent may be configured to continue processing without any dependency upon an outcome of each evict message after that evict message is sent, and thereby can benefit from the performance improvements mentioned earlier, and discussed in the earlier-mentioned patent publication US2015/0032969. In particular, the agent need not track any in-flight evict messages and thereby the complexity and overhead which must be borne by the agent is reduced. This helps make the system more scalable as the number of potential in-flight evict messages increases.

There are a number of ways in which the apparatus can be arranged to ensure that the evict barrier message is only processed by the coherency control circuitry once all evict messages resulting from performance of the flush operation have been processed by the coherency control circuitry. In one example implementation, the interconnect circuitry is configured to ensure that this ordering is maintained. For example, the interconnect circuitry may be configured to ensure that the evict barrier message is only received by the coherency control circuitry once all evict messages resulting from performance of the flush operation have been received by the coherency control circuitry.

The interconnect circuitry can be organised in a variety of ways, but in one example implementation provides a plurality of communication channels between each one of the plurality of agents and the coherency control circuitry. In such an arrangement, the given agent may be arranged to issue, over a given one of the plurality of communication channels, any evict messages and the evict barrier message. By ensuring that evict messages and the evict barrier message are issued over the same communication channel, this can simplify the issue of seeking to maintain the ordering between the evict barrier message and any earlier evict message, hence including all of the evict messages issued as part of the earlier-mentioned flush operation.

For example, the given one of the plurality of communication channels may be constrained to operate as an in order channel so that all messages issued over that communication channel are delivered to the coherency control circuitry in a same order as those message were issued by the given agent.

Which communication channel is used can be varied dependent on implementation. However, in one example implementation the interconnect circuitry provides a write address communication channel and a read address communication channel, and each evict message and the evict barrier message are sent via the read address communication channel.

However, it is not a requirement that the evict messages and evict barrier message are issued on the same communication channel, and any other suitable mechanism can be employed in order to ensure that the evict barrier message is not processed by the coherency control circuitry until all evict messages preceding that evict barrier message have been processed. For example, in one implementation the evict messages and the evict barrier message issued by the given agent may be assigned sequence numbers which are then referred to by the coherency control circuitry when handling such messages. In particular, the coherency control circuitry can make sure that all such messages having assigned sequence numbers are processed in sequence number order, and as a result can ensure that the evict barrier message is only processed by the coherency control circuitry once all evict messages resulting from performance of the flush operation (and indeed any evict messages issued before the evict barrier message from that agent) have been processed by the coherency control circuitry. The sequence numbers can be assigned in a variety of ways. For example, the agent may assign sequence numbers as it issues each evict message or evict barrier message, or alternatively such sequence numbers may be assigned by any component between the agent and the coherency control circuitry (such as an interface component within the interconnect), provided that component receives the messages in the same order as they are issued by the agent.

The coherency control circuitry can be organised in a variety of ways, but in one example implementation has tracking storage to maintain, for each block of data cached by at least one of the plurality of agents, an indication of which agents have a copy of that block of data cached in their associated cache storage. The individual blocks of data tracked can have a variety of different granularities, but typically a block of data will correspond to a cache line's worth of data, and hence the tracking storage will maintain information for each cache line of data cached within at least one of the local cache storages of the agents. The coherency control circuitry is then arranged to reference the tracking storage when determining, responsive to each coherency event, which agents to issue the coherency message to. The tracking storage can take a variety of forms, but will typically take the form of a directory or snoop filter structure, and may be organised so as to keep an accurate record of which agents have which lines of data cached in their associated local caches. In one example implementation, the information maintained within the tacking storage is such that the coherency control circuitry will not need to send coherency messages to an agent that does not have data for a given memory address in a coherent state.

The coherency control circuitry is arranged so as to keep the tracking storage up to date, and in particular responds to various messages issued by the agents indicative of changes in the state of the data held in the local caches of those agents. For example, the coherency control circuitry may be responsive to each evict message to update the tracking storage in respect of a block of data identified by that evict message, to identify that the given agent is no longer caching a copy of that block of data.

There are a number of ways in which the coherency control circuitry can determine, when processing the evict barrier message, when it is appropriate to issue the barrier response message. In one example implementation, the coherency control circuitry is arranged to maintain a record indicative of outstanding coherency messages issued by the coherency control circuitry, and the coherency control circuitry is arranged, when processing the evict barrier message, to issue the barrier response message once the coherency control circuitry has determined, with reference to the record, that there are no outstanding coherency messages for the given agent.

The record can take a variety of forms, for example a list of outstanding coherency messages. However, in one example implementation, the record maintained by the coherency control circuitry is arranged to provide, for each agent, a count indication identifying a number of outstanding coherency messages issued by the coherency control circuitry to that agent. The coherency control circuitry may then be arranged, when processing the evict barrier message, to reference the count indication for the given agent, and to issue the barrier response message when the count indication indicates that there are no outstanding coherency messages for the given agent.

When performing a flush operation, the given agent may issue other forms of message in addition to the earlier-mentioned evict messages. For example, the given agent may be arranged to issue one or more writeback messages to the coherency control circuitry, each writeback message identifying a block of data for which the cache storage of the given agent stored the most up to date version. Hence, in contrast to an evict message that is merely notifying the coherency control circuitry that the given agent is no longer caching the identified block of data, a writeback message actually provides that block of data to the coherency control circuitry in addition to confirming that the given agent is no longer caching that block of data. The coherency control circuitry may then be arranged, in response to the writeback message, to cause the block of data identified by the writeback message to be stored for future access, and in addition issues a writeback response message to the given agent. There are a number of ways in which the block of data can be stored for future access. For instance, it may be stored in a level of cache associated with the coherency control circuitry, for example a system cache, or alternatively that data may be output for storage in memory.

In contrast to the evict messages which are not acknowledged, in one example implementation a writeback response message will be issued to the agent for each writeback message. In such implementations, the given agent may then be arranged to only enter the given state once the barrier response message has been received, and the writeback response message has been received for each writeback message.

The coherency control circuitry can be provided at any suitable location within the system, but in one example implementation is provided in association with a system cache accessible by the plurality of agents. The system cache can be organised in a variety of ways, and in some example implementations at least part of the earlier-mentioned snoop filter/directory structure of the coherency control circuitry can be incorporated within the system cache.

The plurality of agents can take a variety of forms, but in one example implementation each of the plurality of agents comprises a processing core and an associated local cache storage. The processing cores can take a variety of forms, but in one example implementation the techniques described herein are employed within a graphics processing system and the plurality of processor cores comprise a plurality of graphics shader cores. Each agent may include a single graphics shader core, or alternatively one or more of the agents may include multiple graphics shader cores.

Whilst the various agents have associated local cache storage, as discussed earlier there may also be one or more levels of cache that are shared between multiple agents, for example the earlier-mentioned system cache. Whilst evict messages issued by the agent in respect of lines evicted from their local caches may be such that no acknowledgements are returned to the agents for those evict messages, elsewhere in the system evict messages may be responded to. For example, evict messages relating to lines of data evicted from the system level cache may receive acknowledgement signals.

The given state in which an agent does not utilise its associated cache storage can take a variety of forms, but in one example implementation the given state is a low power state. In many systems, it is highly desirable to reduce the overall power consumption, and accordingly various components within the system may be arranged to enter low power states wherever possible, for example when those components are idle. Hence, an agent may adopt a fairly aggressive power saving policy that causes it to seek to enter a low power state wherever possible, and as part of that process may flush its associated cache storage prior to powering down. It will be appreciated that the techniques described herein can be utilised in order to ensure that the agent in such situation powers down at a point in time where implementation of the cache coherency protocol is not compromised, hence avoiding the potential for coherency messages getting lost, and resulting deadlocks arising.

Particular examples will now be described with reference to the figures.

Figure 1:
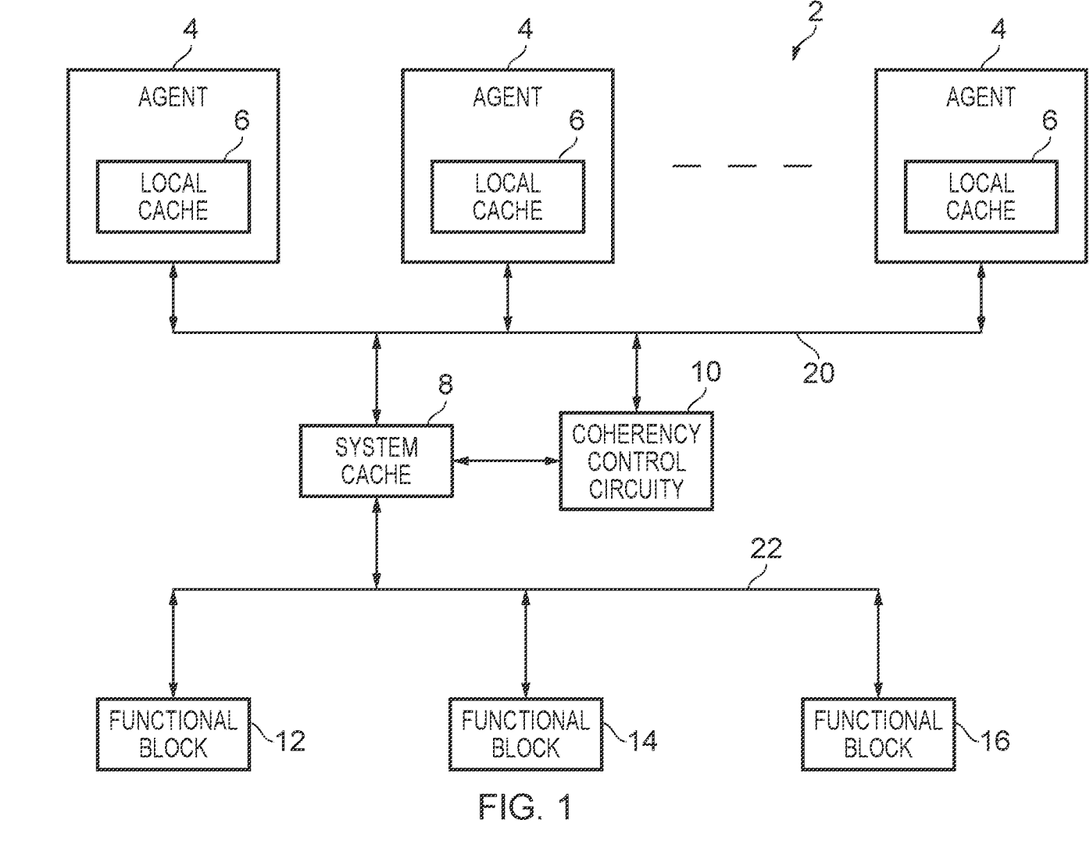
FIG. 1 is a block diagram of a system in accordance with one example implementation.

FIG. 1 is a block diagram of an apparatus 2 in which the techniques described herein may be employed. The apparatus can take a variety of forms, but in one example implementation is a System-on-Chip (SoC) integrated circuit. The apparatus 2 includes a plurality of agents 4 that each have associated local cache structures 6. Those local cache structures may comprise a single level of cache, or in some example implementations may include more than one level of cache. The individual agents can take a variety of forms, but in one example implementation may take the form of graphics processing units (GPUs), or of individual graphics shader cores within a graphics processing unit.

The various agents 4 are coupled to an interconnect 20 via which they may communicate with a system cache 8 shared amongst the agents, and with coherency control circuitry 10 used to implement cache coherency. In particular, the coherency control circuitry is arranged to act as a point of coherency for cacheable data, by implementing a cache coherency protocol to ensure that each agent 4, when seeking to access an item of data, is arranged to access the most up to date version of that item of data.

The coherency control circuitry 10 can be organised in a variety of ways, but typically incorporates a snoop filter/directory structure in order to track which local caches 6 have cached particular blocks of data (such blocks of data also being referred to herein as lines of data, due to the typical size of data being tracked corresponding to the data that fits within a single cache line). Hence, when the agent 4 seeks to access a block of data that is not found within its local cache 6, that request can be propagated onto the coherency control circuitry, which can then determine whether any of the local caches 6 associated with other agents have cached a copy of that data, and can then issue coherency messages as required to those agents in order to ensure that the required data is retrieved for access by the requesting agent. Depending on the cache coherency protocol utilised, various different steps may be taken by the local caches 6 of the agents 4 when handling such coherency messages. For example, they may merely invalidate their local copy, may return their copy to the coherency control circuitry, and/or may change some status information associated with any cached copy of the data that they retain, for example to change status from being "unique" to "shared" if they are retaining a copy but it is now known that another agent will also cache a copy of that data.

In summary, coherency control is managed within the system of FIG. 1 by utilising a suitable cache coherency protocol for handling memory access requests that supports the passing of appropriate coherency messages between the agents. An example of such a protocol is the ACE (AXI Coherency Extension) protocol forming part of the AMBA specification developed by Arm Limited of Cambridge, England.

In FIG. 1, the coherency control circuitry 10 is provided in association with the system cache 8, but there is no requirement for the coherency control circuitry to be placed at such a location within the system, and in alternative implementations the coherency control circuitry may be located elsewhere, provided it can act as a point of coherency for the data being cached locally by the agents 4 in their local caches 6. When the coherency control circuitry 10 is provided in association with a system cache 8, then in some example implementations the above-mentioned snoop filter/directory structures can be at least partially incorporated within the system cache storage.

As also shown in FIG. 1, the interconnect 20 may be extended so as to include additional communication paths such as communication paths 22, allowing the agents to communicate with other functional blocks 12, 14, 16 within the system. The functional blocks can take a wide variety of different forms, but at least some may take the form of slave elements for servicing requests issued by the agents. One or more of the slave elements may indeed be memory components used for storing data for access by the agents, and subsets of the stored data in memory may be cached within the cache structures 6, 8 of the system.

The interconnect circuitry 20, 22 can be organised in a variety of ways, but in one example implementation includes a plurality of communication channels, such as the 5-channel communication used in accordance with the AXI Standard designed by Arm Limited of Cambridge, England.

Figure 3:
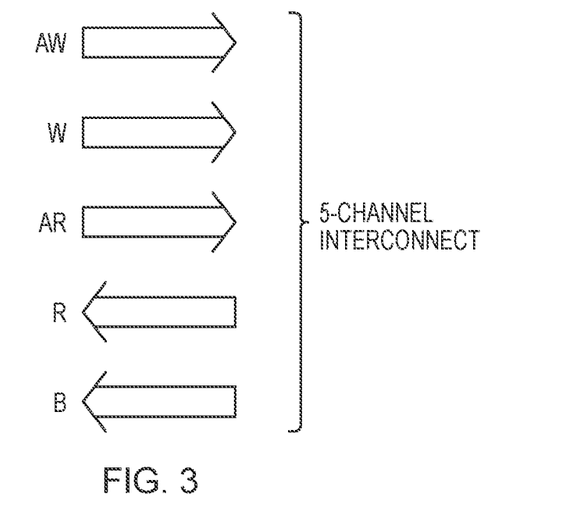
FIG. 3 is a diagram schematically illustrating the provision of multiple communication channels within interconnect circuitry.

FIG. 3 schematically illustrates an example of a plurality of communication channels which may be provided by the interconnect circuitry. In particular, the channels may include a write address channel AW, a write data channel W, a read address channel AR, a read data channel R and a response channel B. It will however be appreciated that other multi-channel communication protocols may be used, and the present techniques may be applied to such different arrangements.

The interconnect circuitry is schematically illustrated in FIG. 1 in the form of a simple bus, but it will be appreciated that in practice such interconnect circuitry can take a wide variety of different forms which may include multiple busses, buffers, multiplexers and the like. Such interconnect circuitry may support overlapping communications in different directions at the same time using different channels. The communications may take place over an extended sequence of clock cycles and multiple point-to-point communications may be supported. The present techniques may be applied to a wide variety of different forms of interconnect circuitry.

In accordance with the techniques described herein, when an agent 4 evicts a cache line from its local cache 6, it will issue an evict message to the coherency control circuitry 10 over the interconnect circuitry 20 to indicate that it is no longer caching a copy of the data at the memory address identified in the evict message. Typically, for many of the messages that are passed over the interconnect circuitry, a handshake mechanism is employed, for example using a request/acknowledge protocol, so that the source of a particular message receives an acknowledgement from the destination to confirm that the message has been received. However, as discussed in the earlier mentioned commonly owned patent publication US2015/0032969, performance improvements can be realised by allowing evict messages to be issued without a requirement for an acknowledgement to be received.

In particular, this allows the agent issuing the evict message to then continue processing without waiting for the acknowledgement. Hence, by way of example, if an agent issues an evict message for a line of data and then wishes shortly thereafter to issue a read message relating to that line of data, then there is no need for the read message to be stalled pending receipt of an acknowledgement for the evict message. Instead, in order to ensure that ordering is maintained, the system is arranged so that the evict message and subsequent read message are sent over the same communication channel through the interconnect circuitry 20, and that the communication channel is such that the read message cannot overtake the evict message. Further, the coherency control circuitry 10 is configured such that it processes the evict message ahead of the read message so that the messages cannot be reordered within the coherency control circuitry itself. By ensuring that these constraints are met, then it is save to allow evict messages to be issued without requiring associated acknowledgement messages to be issued, which can increase performance and reduce overhead and complexity associated with the agent 4.

However, as discussed earlier, this can give rise to certain coherency control issues when one of the agents determines that it wishes to enter a state in which its local cache 6 is no longer used. This could for example take place if the agent 4 wished to enter a low power mode of operation, and effectively at that point turn off its local cache 6. As part of the preparation for entering such a lower power mode of operation, the agent's local cache 6 may be flushed which could result in a number of evict messages being issued to the coherency control circuitry 10. To ensure no coherency messages are lost, and that hence no data loss and/deadlock issues could arise, it is important to ensure that the agent 4 does not enter the low power state until the evict messages have been handled by the coherency control circuitry and any pending coherency messages issued to that agent's local cache have been processed. In accordance with the techniques described herein, this is achieved through the use of an evict barrier message.

In particular, as will be discussed in more detail herein, when during a cache flush operation an agent's local cache 6 issues a number of evict messages, then once all of the required evict messages have been issued, the agent/local cache is arranged to issue a evict barrier message to the coherency control circuitry 10. The apparatus is arranged to ensure that the evict barrier message is only processed by the coherency control circuitry 10 once all of the evict messages preceding that evict barrier message have been processed, and hence all the evict messages resulting from performance of the flush operation have been processed by the coherency control circuitry. This can be achieved in a variety of ways, for example by allocating sequence numbers to the various evict messages and subsequent evict barrier message, in order to ensure that the evict barrier message is not processed before any preceding evict messages, or alternatively it can be ensured that the evict barrier message is sent over the same communication channel as the evict messages, and that that communication channel is organised so as to maintain ordering of the messages sent over it. In one particular example implementation, this is achieved by using the read address (AR) channel for transmitting all of the evict messages and the subsequent evict barrier message. The AR channel is constrained to operate as an in order channel, and hence maintains ordering of the messages sent over it.

By taking such an approach, it can be ensured that by the time the coherency control circuitry is processing an evict barrier message, all preceding evict messages will have been received and processed by the coherency control circuitry. Hence, all of these evict messages will have been observed by the point of coherence, and this guarantees that no new coherency messages can be generated in respect of that evicted data for the agent that is seeking to enter the low power state. However, it also needs to be ensured that any pending coherency messages for the agent that have already been issued have been handled and responded to. In order to meet this requirement, the coherency control circuitry only issues a barrier response message when processing the evict barrier message, once it has been determined that there are no outstanding coherency messages that have been issued by the coherency control circuitry 10 to the relevant agent (i.e. the agent that is seeking to enter the low power state and hence has performed the cache flush operation). This hence guarantees that there are no inflight coherency messages for the agent, by the time that agent receives the barrier response message.

The agent defers entering the given state until at least the barrier response message has been received. It may, in addition to the barrier response message, need to wait for certain other messages before entering the low power state. For example, in addition to evict messages, during the cache flush operation the agent's local cache 6 may issue writeback messages when the data being invalided in the local cache is the most up to date version of the data, and hence that data needs to be written back to another entity within the system, for example the system cache 8 and/or main memory. Such writeback messages are acknowledged by the coherency control circuitry, and accordingly the agent will also wait for any required writeback response messages before entering the low power state.

Figure 2:
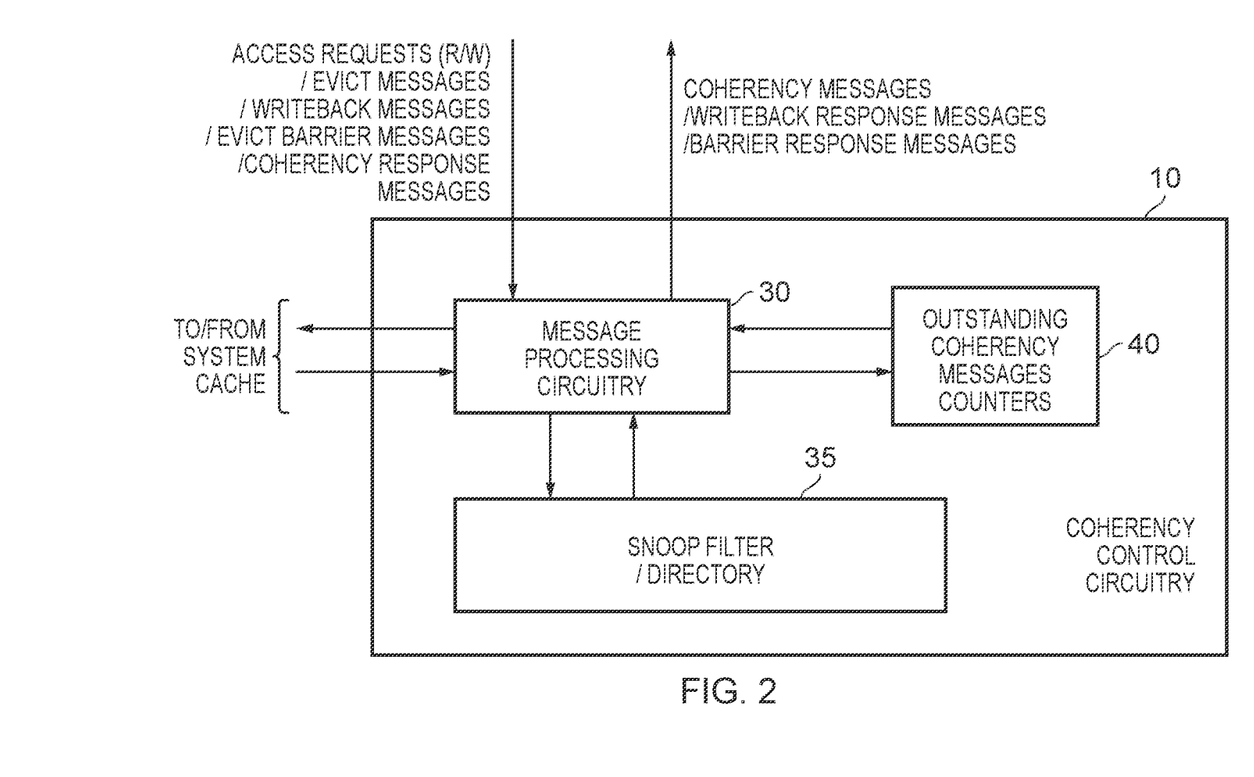
FIG. 2 is a block diagram illustrating in more detail the coherency control circuitry of FIG. 1 in accordance with one example implementation.

FIG. 2 is a block diagram illustrating components provided within the coherency control circuitry 10 in accordance with one example implementation. The coherency control circuitry includes message processing circuitry 30 that processes any received messages, and issues any required responses. The message processing circuitry 30 will also issue coherency messages when that is considered necessary having regards to the cache coherency protocol. The message processing circuitry 30 may also communicate with the system cache 8, and has access to a snoop filter/directory 35 that maintains a record of certain memory addresses whose data has been cached in at least one of the local caches 6, and for those addresses identifies which local caches have cached a copy of the data.

When an access request (either a read request or a write request) is received by the message processing circuitry 30 from a particular agent or its associated local cache 6, then the message processing circuitry 30 can reference the snoop filter/directory 35 in order to determine whether any of the local caches 6 associated with other agents store a copy of the data for the specified memory address, and if so can send coherency messages to the relevant agents/local caches. As discussed earlier, the actions taken in response to those coherency messages will vary dependent on the coherency protocol employed, but may involve those agents invalidating their local copies and/or returning a copy of the data they have cached to the coherency control circuitry so that it may be provided to the requesting agent.

As shown in FIG. 2, in addition to such access requests received by the message processing circuitry 30, the message processing circuitry 30 will also receive the earlier-mentioned evict messages, writeback messages and evict barrier messages. It will also receive coherency response messages returned in reply to coherency messages output by the message processing circuitry. As also shown in FIG. 2, the message processing circuitry 30 may issue writeback response messages when it has processed received writeback messages, and barrier response messages when it has processed received evict barrier messages. However, as noted earlier, no response messages are sent in reply to evict messages received by the message processing circuitry 30.

As also shown in FIG. 2, counter circuitry 40 is provided for keeping track, on an agent-by-agent basis, of the number of outstanding coherency messages that have been issued to that agent. Hence, at any point in time, the message processing circuitry 30 can determine if, for any particular agent, there are any coherency messages that have been issued and for which a response is still awaited.

Figure 4:
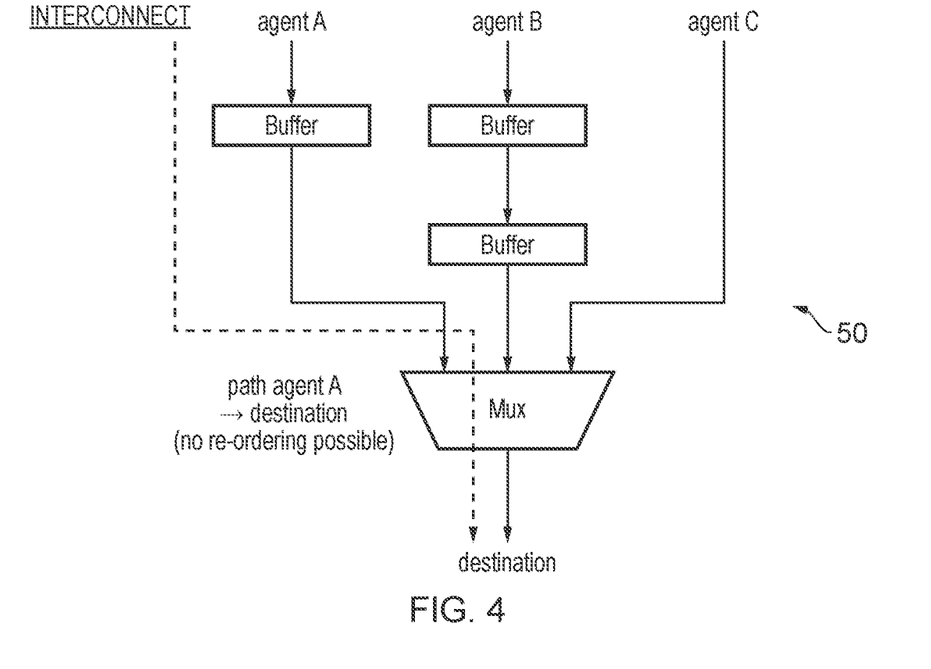
FIG. 4 schematically illustrates the structure of an interconnect including communication paths which do not permit re-ordering.

As mentioned earlier, in one example implementation the apparatus is arranged to ensure that the evict barrier message is only processed by the coherency control circuitry once all preceding evict messages have been processed by the coherency control circuitry by arranging the interconnect circuitry, or more particularly a specific communication channel therein, to ensure the in order transmission of messages, thus ensuring that messages cannot be reordered when travelling between the source and destination. FIG. 4 schematically illustrates a portion of the interconnect circuitry 20 in accordance with one example implementation. The portion illustrated shows the read address communication paths 50 between three different agents and a destination (such as the coherency control circuitry). The communication paths are relatively simple and include busses, latches and multiplexers. These arrangements do not permit reordering to occur within any given path. Thus, any evict messages sent from one agent to the coherency control circuitry may not be reordered relative to a subsequently issued evict barrier message, as the physical communication path provided does not permit such reordering to occur.

Figure 5:
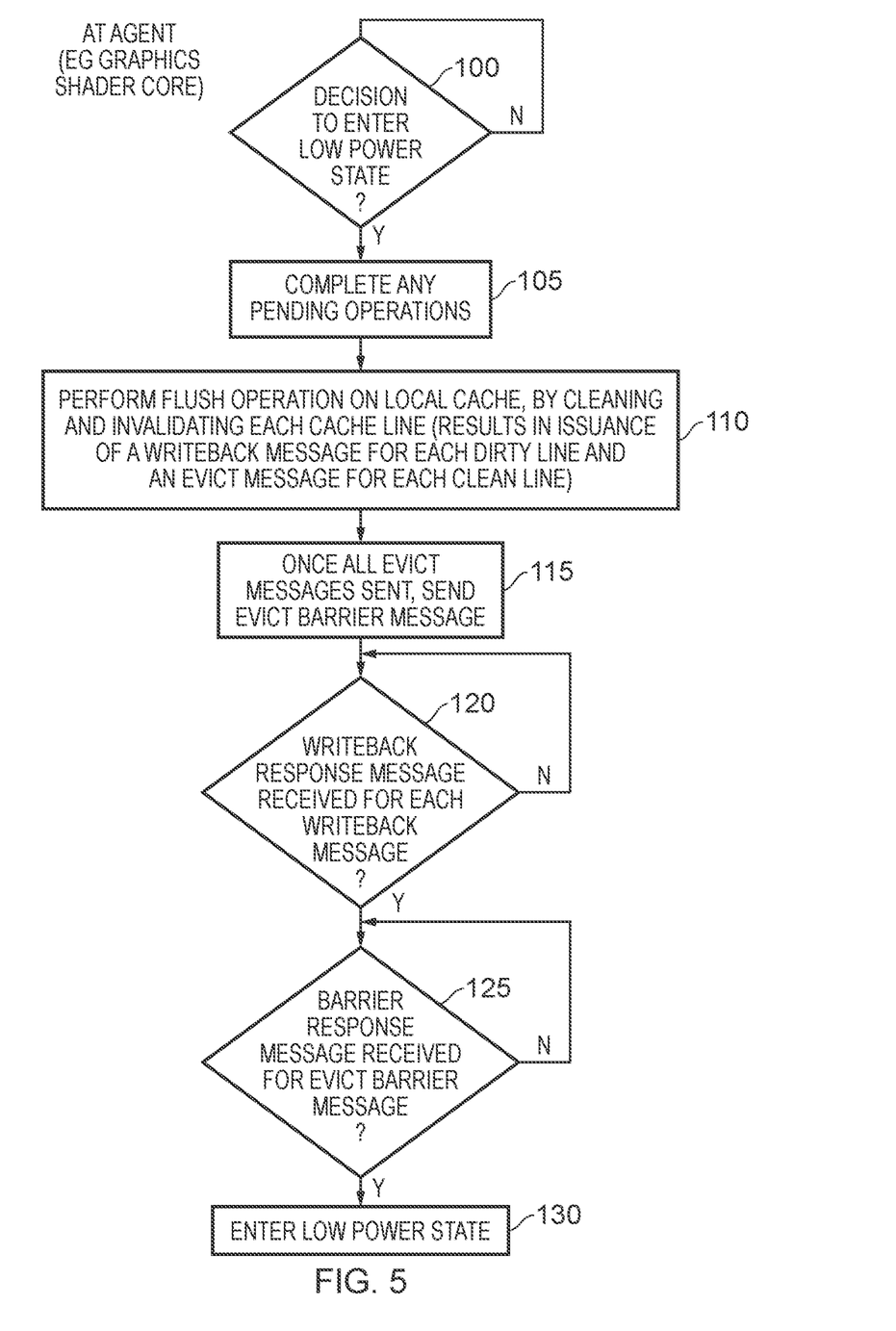
FIG. 5 is a flow diagram illustrating steps performed by an agent prior to entering a low power state, in accordance with one example implementation.

FIG. 5 is a flow diagram illustrating steps undertaken at an agent 4 in order to allow that agent to enter a low power state. At step 100, it is determined whether a decision has been taken to enter a low power state. This can occur for a variety of reasons, but it is often the case that the agents will be employed within a system where power consumption is a key consideration, and accordingly when the state of the processing of the system permits, it may be desirable for one or more individual agents to be placed into a low power state in order to reduce power consumption of the system. This may for example occur if a particular agent is not currently being allocated work to perform.

Once a decision has been taken to enter the low power state, then at step 105 the agent completes any pending operations that are still outstanding. It should be noted that in some instances there may in fact not be any pending operations to perform, for example if the decision to enter the low power state is taken due to the agent being idle.

Once any pending operations have been completed, then at step 110 a flush operation is performed by the agent in respect of its local cache 6 in order to clean and invalidate each cache line within the cache. This will typically result in the issuance of messages to the coherency control circuitry for any cache line that is marked as valid within the local cache. If the valid cache line is also marked as dirty, this will identify that the cached content is the most up to date version of the content, and accordingly a writeback message will be issued to the coherency control circuitry identifying the data and the memory address of that data, so that that data can be stored elsewhere within the system, for example within the system cache 8 and/or main memory. However, if a valid cache line is clean, this means that the content is already held elsewhere within the system, and accordingly it is merely necessary to invalidate the cache line. Nevertheless an evict message is sent to the coherency control circuitry 10 to notify the coherency control circuitry that the local cache 6 is no longer caching a copy of that data, this allowing the coherency control circuitry to update its record maintained within the snoop filter/directory 35.

At step 115, once all evict messages have been sent, then an evict barrier message is issued to the coherency control circuitry 10. At step 120, it is then determined whether writeback response messages have been received for each writeback message that has been issued during the flush operation. Once that is the case, it is also determined at step 125 whether a barrier response message has been received for the evict barrier message. It will be appreciated that whilst steps 120 and 125 are shown sequentially, these checks may be performed in parallel, so that as soon as all of the writ back response messages have been received and the barrier response message has been received, the process may then progress to step 130 where the agent can enter the low power state.

In one example implementation, the evict barrier message can be sent as soon as the last evict message has been issued. Further, there is no need to wait for any writeback response messages to be received before issuing the evict barrier message, although in an alternative implementation, if desired, the system may await receipt of all of the writeback acknowledgements before issuing the evict barrier message.

Figure 6:
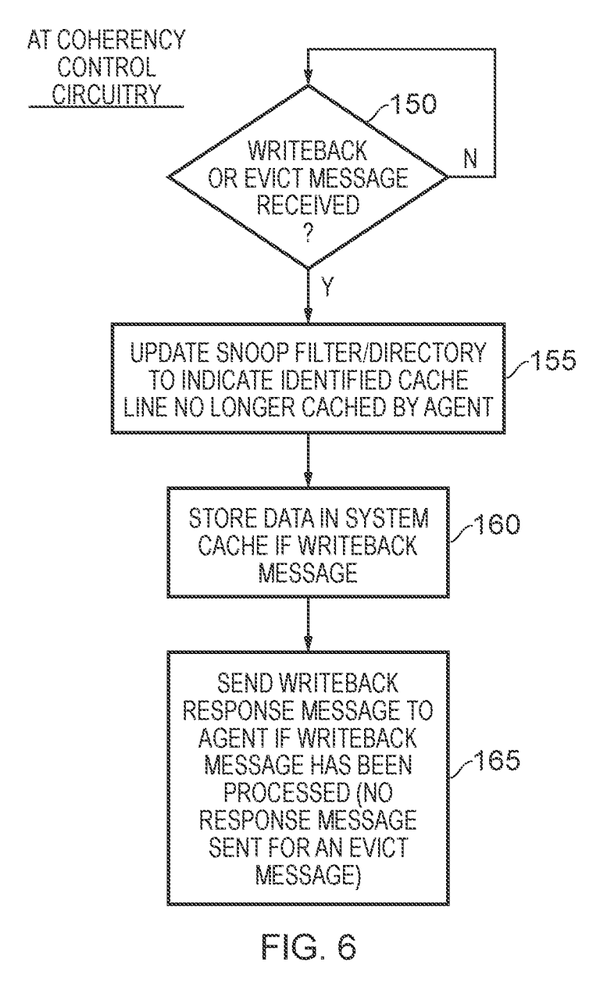
FIG. 6 is a flow diagram illustrating steps performed by the coherency control circuitry upon receipt of either a writeback message or an evict message, in accordance with one example implementation.

FIG. 6 is a flow diagram illustrating steps performed at the coherency control circuitry 10 when processing writeback or evict messages. At step 150, it is determined whether a writeback or an evict message has been received. If so, the process proceeds to step 155 where the snoop filter/directory 35 is updated to indicate that the cache line identified by the writeback or evict message is no longer being cached by the agent that has issued that writeback or evict message.

As mentioned earlier, if the message is a writeback message, that message will also identify the data for the cache line, and that data is then, in one example implementation, stored at step 160 in the system cache. However, there is no requirement for it to be stored in the system cache, and in other implementations the data may be propagated on to main memory if desired.

In one example implementation, the snoop filter/directory 35 tracks which local caches 6 have stored copies of data at particular addresses, but does not directly track what is stored within the system cache. However, such information may be at least implicitly derived by the snoop filter/directory, depending on how the snoop filter/directory is implemented. For example, if the snoop filter/directory structure is incorporated as part of the system cache, then it may be the case that the data for all addresses being tracked with the snoop filter/directory is also stored in the system cache. In such a combined directory and cache unit, each directory entry would have storage for the corresponding data line.

As indicated at step 165, a writeback response message is sent to the agent if the message being processed is a writeback message. However, as noted earlier, no response message is sent if instead an evict message has been processed.

Figure 7:
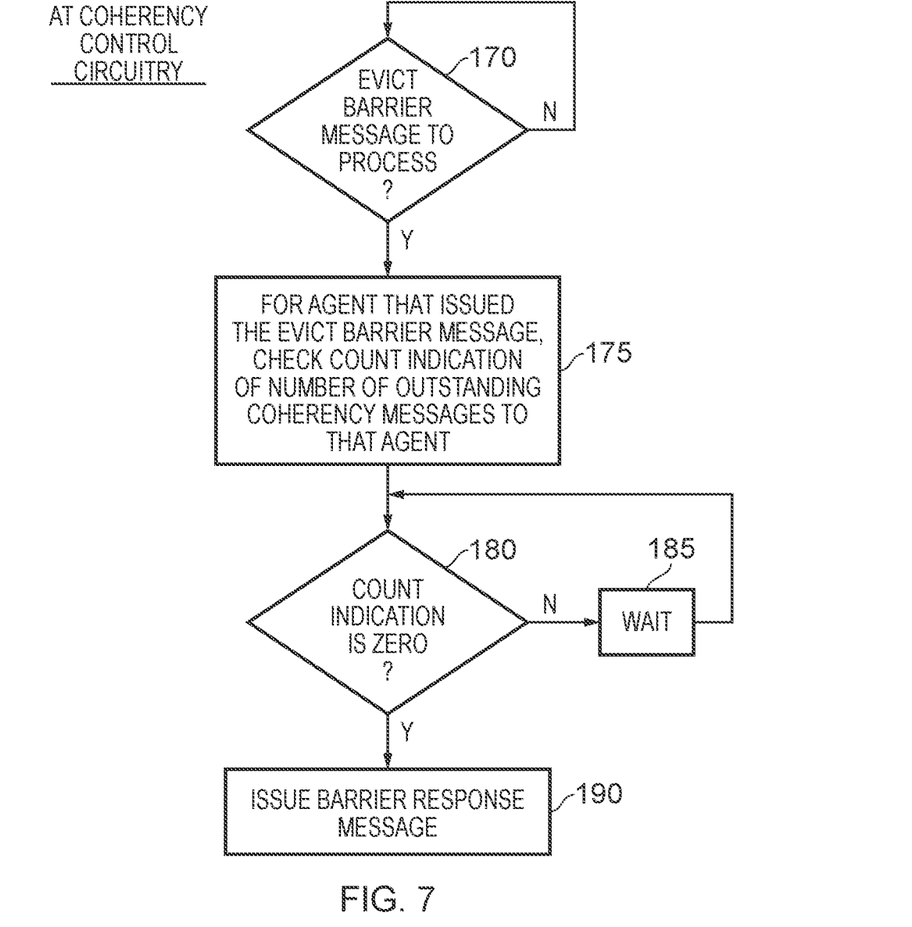
FIG. 7 is a flow diagram illustrating steps performed by the coherency control circuitry upon receipt of an evict barrier message, in accordance with one example implementation.

FIG. 7 is a flow diagram illustrating the steps performed by the coherency control circuitry 10 in order to process an evict barrier message. At step 170, it is determined if the evict barrier message is to be processed. As discussed earlier, if this point is reached, it is known that any preceding evict messages from the agent that has issued the evict barrier message will already have been received and processed by the coherency control circuitry due to the ordering that is enforced between the evict messages and the evict barrier message as discussed earlier.

At step 175, once it has been determined that there is an evict barrier message to process, the message processing circuitry 30 of the coherency control circuitry 10 references the counters 40 in order to determine, for the agent that has issued the evict barrier message, whether there are any outstanding coherency messages to that agent. It is then determined at step 180 whether the count indication for that agent is zero, and if not the process waits at step 185 before rechecking the count indication at step 180. Once the count indication is zero, the process proceeds to step 190 where a barrier response message is issued to the agent.

As will be apparent from the earlier discussion of FIG. 5, once the barrier response message has been received by the agent then, provided any writeback response messages required have also been received, the agent may enter the low power state, without any risk of compromising correct operation of the cache coherency protocol being implemented within the system.

Through use of the evict barrier mechanism described herein, and in particular by ensuring that the evict barrier message is only processed by the coherency control circuitry once any preceding evict messages from the same agent have also been processed, and that the barrier response message is only sent once it is determined that there are no outstanding coherency messages that have been issued by the coherency control circuitry to the agent, this ensures that the system is naturally placed into a state in accordance with the protocol where no coherency messages to a powered off agent are possible. This hence provides a particularly elegant and efficient mechanism for handling the issue of a coherent agent being powered down within a system that allows evict messages to be sent that are not acknowledged, whilst ensuring that no coherency messages are lost, and hence avoiding possible deadlock scenarios arising.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware that provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
a plurality of agents having cache storage to cache data;
coherency control circuitry to act as a point of coherency for the data by implementing a cache coherency protocol to ensure that each agent, when accessing an item of data, accesses a most up to date version of that item of data, wherein in accordance with the cache coherency protocol the coherency control circuitry is responsive to a coherency event to issue coherency messages to one or more of the agents; and
interconnect circuitry to provide communication between the plurality of agents and the coherency control circuitry;
wherein:
a given agent amongst the plurality of agents is arranged, prior to entering a given state in which its cache storage is unused, to perform a flush operation in respect of its cache storage that causes one or more evict messages to be issued to the coherency control circuitry, and the given agent is further arranged, once all evict messages resulting from performance of the flush operation have been issued, to issue an evict barrier message to the coherency control circuitry;
the apparatus is arranged to ensure that the evict barrier message is only processed by the coherency control circuitry once all evict messages resulting from performance of the flush operation have been processed by the coherency control circuitry;
the coherency control circuitry is arranged, when processing the evict barrier message, to issue a barrier response message to the given agent once the coherency control circuitry determines that no there are no outstanding coherency messages issued by the coherency control circuitry to the given agent; and
the given agent is arranged to defer entering the given state until at least the barrier response message has been received.

2. An apparatus as claimed in claim 1, wherein the given agent is configured to continue processing without any dependency upon an outcome of each evict message after that evict message is sent.

3. An apparatus as claimed in claim 1, wherein:
the interconnect circuitry is configured to ensure that the evict barrier message is only received by the coherency control circuitry once all evict messages resulting from performance of the flush operation have been received by the coherency control circuitry.

4. An apparatus as claimed in claim 1, wherein:
the interconnect circuitry provides a plurality of communication channels between each one of the plurality of agents and the coherency control circuitry; and
the given agent is arranged to issue, over a given one of the plurality of communication channels, any evict messages and the evict barrier message.

5. An apparatus as claimed in claim 4, wherein the given one of the plurality of communication channels is constrained to operate as an in order channel so that all messages issued over the given one of the plurality of communication channels are delivered to the coherency control circuitry in a same order as those message were issued by the given agent.

6. An apparatus as claimed in claim 4, wherein the interconnect circuitry provides a write address communication channel and a read address communication channel, and each evict message and the evict barrier message are sent via the read address communication channel.

7. An apparatus as claimed in claim 1, wherein the evict messages and the evict barrier message issued by the given agent are assigned sequence numbers which are referred to by the coherency control circuitry in order to ensure that the evict barrier message is only processed by the coherency control circuitry once all evict messages issued before the evict barrier message have been processed by the coherency control circuitry.

8. An apparatus as claimed in claim 1, wherein:
the coherency control circuitry has tracking storage to maintain, for each block of data cached by at least one of the plurality of agents, an indication of which agents have a copy of that block of data cached in their associated cache storage; and
the coherency control circuitry is arranged to reference the tracking storage when determining, responsive to each coherency event, which agents to issue the coherency message to.

9. An apparatus as claimed in claim 8, wherein:
the coherency control circuitry is responsive to each evict message to update the tracking storage in respect of a block of data identified by that evict message, to identify that the given agent is no longer caching a copy of that block of data.

10. An apparatus as claimed in claim 1, wherein:
the coherency control circuitry is arranged to maintain a record indicative of outstanding coherency messages issued by the coherency control circuitry; and
the coherency control circuitry is arranged, when processing the evict barrier message, to issue the barrier response message once the coherency control circuitry has determined, with reference to the record, that there are no outstanding coherency messages for the given agent.

11. An apparatus as claimed in claim 10, wherein:
the record maintained by the coherency control circuitry is arranged to provide, for each agent, a count indication identifying a number of outstanding coherency messages issued by the coherency control circuitry to that agent; and
the coherency control circuitry is arranged, when processing the evict barrier message, to reference the count indication for the given agent, and to issue the barrier response message once the count indication indicates that there are no outstanding coherency messages for the given agent.

12. An apparatus as claimed in claim 1, wherein:
the given agent is arranged, during performance of the flush operation in respect of its cache storage, to issue one or more writeback messages to the coherency control circuitry, each writeback message identifying a block of data for which the cache storage of the given agent stored the most up to date version;
the coherency control circuitry is arranged, in response to each writeback message, to cause the block of data identified by the writeback message to be stored for future access, and to issue a writeback response message to the given agent; and
the given agent is arranged to only enter the given state once the barrier response message has been received, and the writeback response message has been received for each writeback message.

13. An apparatus as claimed in claim 1, wherein the coherency control circuitry is provided in association with a system cache accessible by the plurality of agents.

14. An apparatus as claimed in claim 1, wherein the plurality of agents comprises a plurality of graphics shader cores.

15. An apparatus as claimed in claim 1, wherein the given state is a low power state.

16. A method of managing coherency in an apparatus with a plurality of agents having cache storage to cache data, comprising:
employing coherency control circuitry to act as a point of coherency for the data by implementing a cache coherency protocol to ensure that each agent, when accessing an item of data, accesses a most up to date version of that item of data;
arranging the coherency control circuitry, in accordance with the cache coherency protocol, to be responsive to a coherency event to issue coherency messages to one or more of the agents;
employing interconnect circuitry to provide communication between the plurality of agents and the coherency control circuitry;
causing a given agent amongst the plurality of agents, prior to entering a given state in which its cache storage is unused, to perform a flush operation in respect of its cache storage that causes one or more evict messages to be issued to the coherency control circuitry;
issuing from the given agent, once all evict messages resulting from performance of the flush operation have been issued, an evict barrier message to the coherency control circuitry;
applying an ordering technique to ensure that the evict barrier message is only processed by the coherency control circuitry once all evict messages resulting from performance of the flush operation have been processed by the coherency control circuitry;
arranging the coherency control circuitry, when processing the evict barrier message, to issue a barrier response message to the given agent once the coherency control circuitry determines that no there are no outstanding coherency messages issued by the coherency control circuitry to the given agent; and
constraining the given agent to defer entering the given state until at least the barrier response message has been received.

17. An apparatus comprising:
a plurality of agent means having cache storage for caching data;
coherency control means for acting as a point of coherency for the data by implementing a cache coherency protocol to ensure that each agent means, when accessing an item of data, accesses a most up to date version of that item of data, wherein in accordance with the cache coherency protocol the coherency control means is responsive to a coherency event to issue coherency messages to one or more of the agent means; and
interconnect means for providing communication between the plurality of agent means and the coherency control means;
wherein:
a given agent means amongst the plurality of agent means is arranged, prior to entering a given state in which its cache storage is unused, for performing a flush operation in respect of its cache storage that causes one or more evict messages to be issued to the coherency control means, and the given agent means is further arranged, once all evict messages resulting from performance of the flush operation have been issued, for issuing an evict barrier message to the coherency control means;

the apparatus is arranged to ensure that the evict barrier message is only processed by the coherency control means once all evict messages resulting from performance of the flush operation have been processed by the coherency control means;

the coherency control means, when processing the evict barrier message, for issuing a barrier response message to the given agent means once the coherency control means determines that no there are no outstanding coherency messages issued by the coherency control means to the given agent means; and the given agent means for deferring entering the given state until at least the barrier response message has been received.

* * * * *